Apr. 24, 1923.

J. E. BOYCE 1,452,490

CORRECTING DEVICE FOR FLOOR CONTROLLERS

Filed April 14, 1921

Inventor
John E. Boyce
By his Attorney
L. H. Campbell

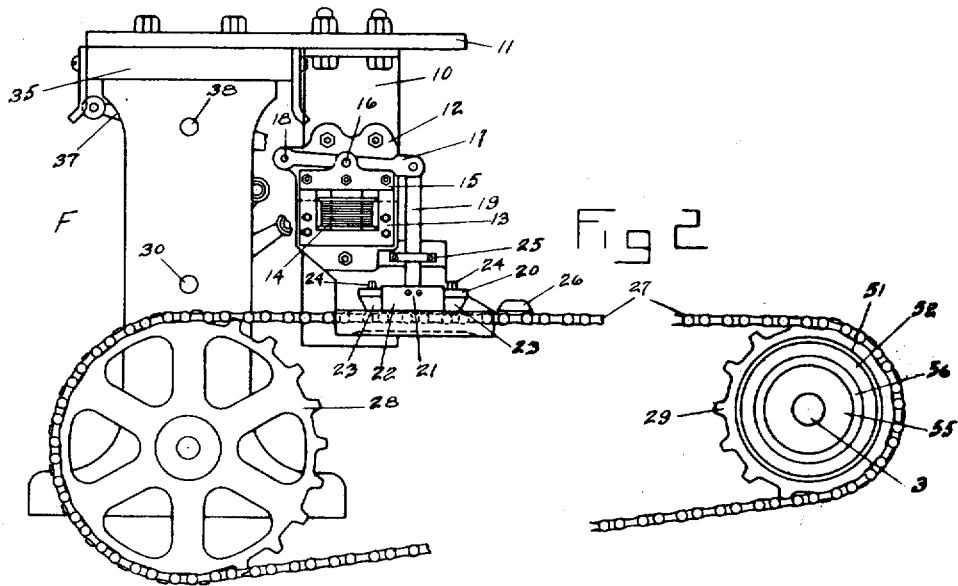
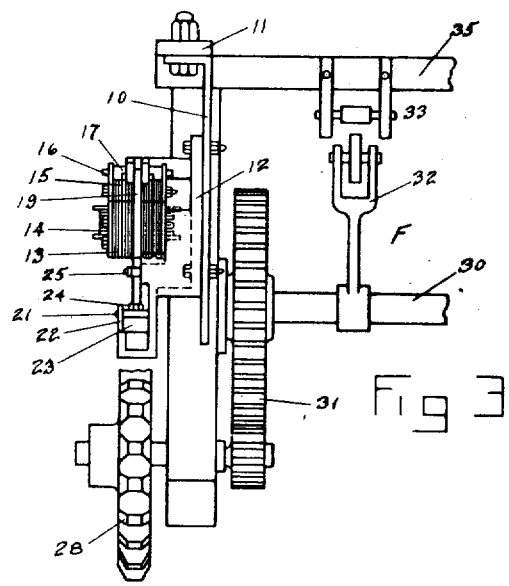

Apr. 24, 1923.
J. E. BOYCE
1,452,490
CORRECTING DEVICE FOR FLOOR CONTROLLERS
Filed April 14, 1921
9 Sheets-Sheet 3
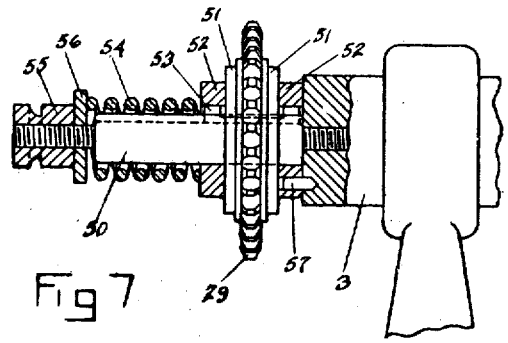
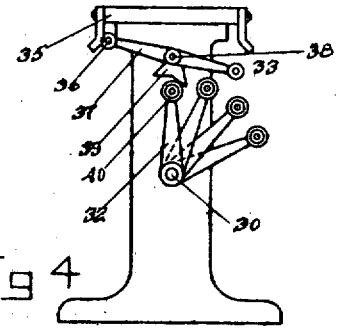
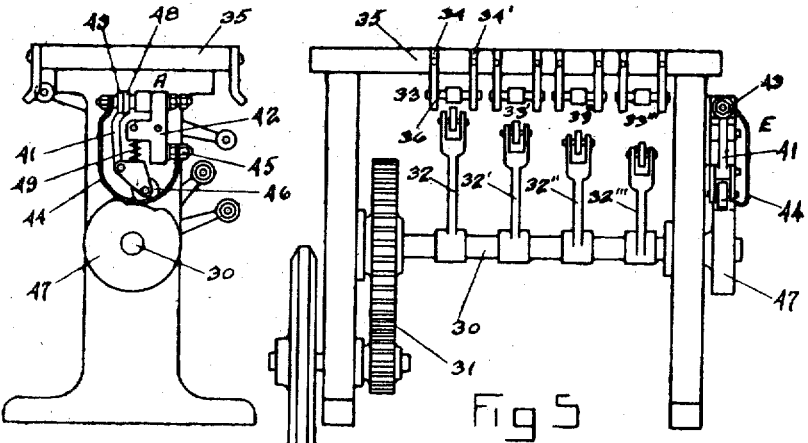
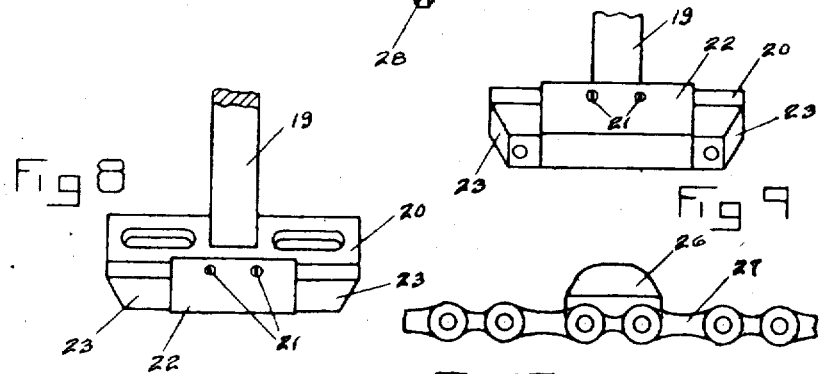
Inventor
John E. Boyce
By his Attorney
L. N. Campbell Apr. 24, 1923.
J. E. BOYCE
1,452,490
CORRECTING DEVICE FOR FLOOR CONTROLLERS
Filed April 14, 1921
9 Sheets-Sheet 4
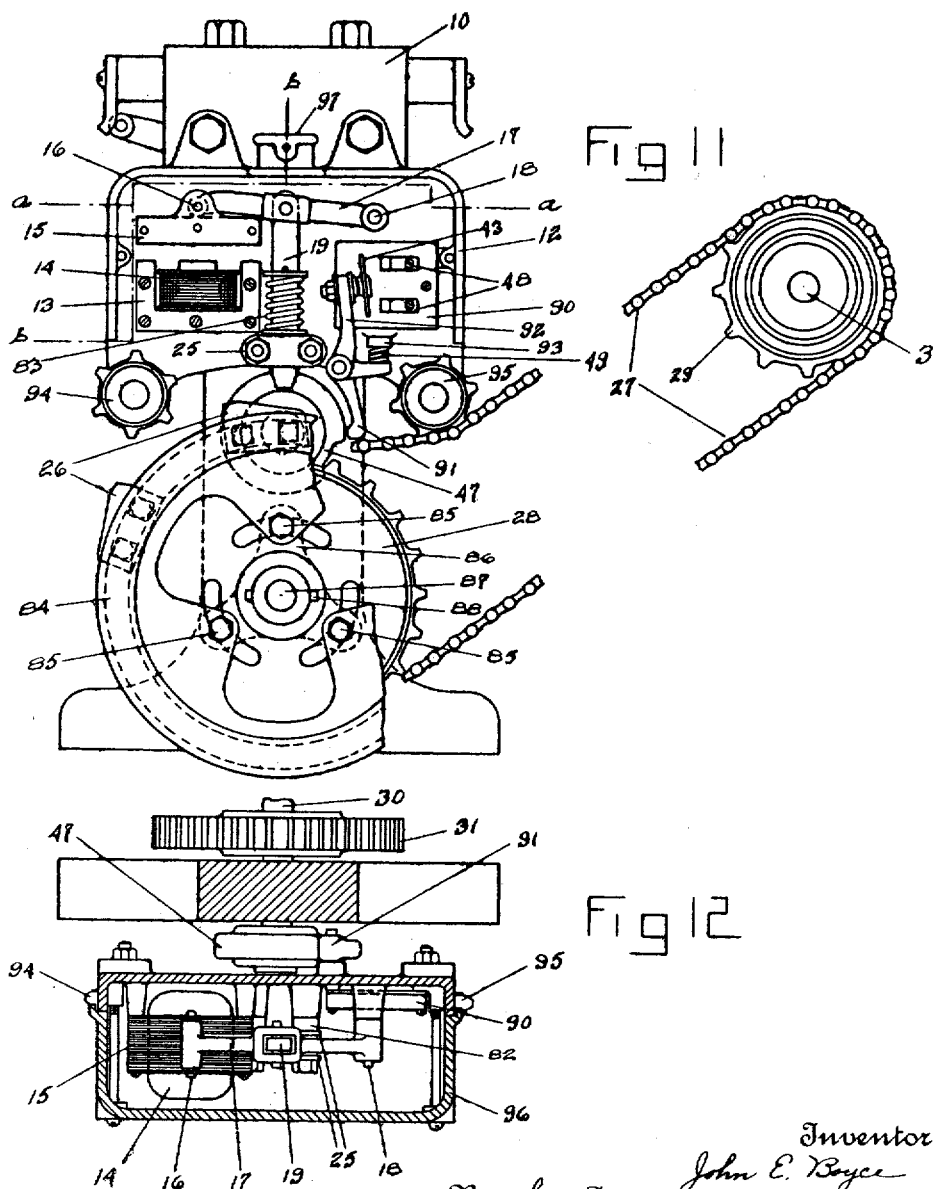
Inventor
John E. Boyce
By his Attorney
L. H. Campbell

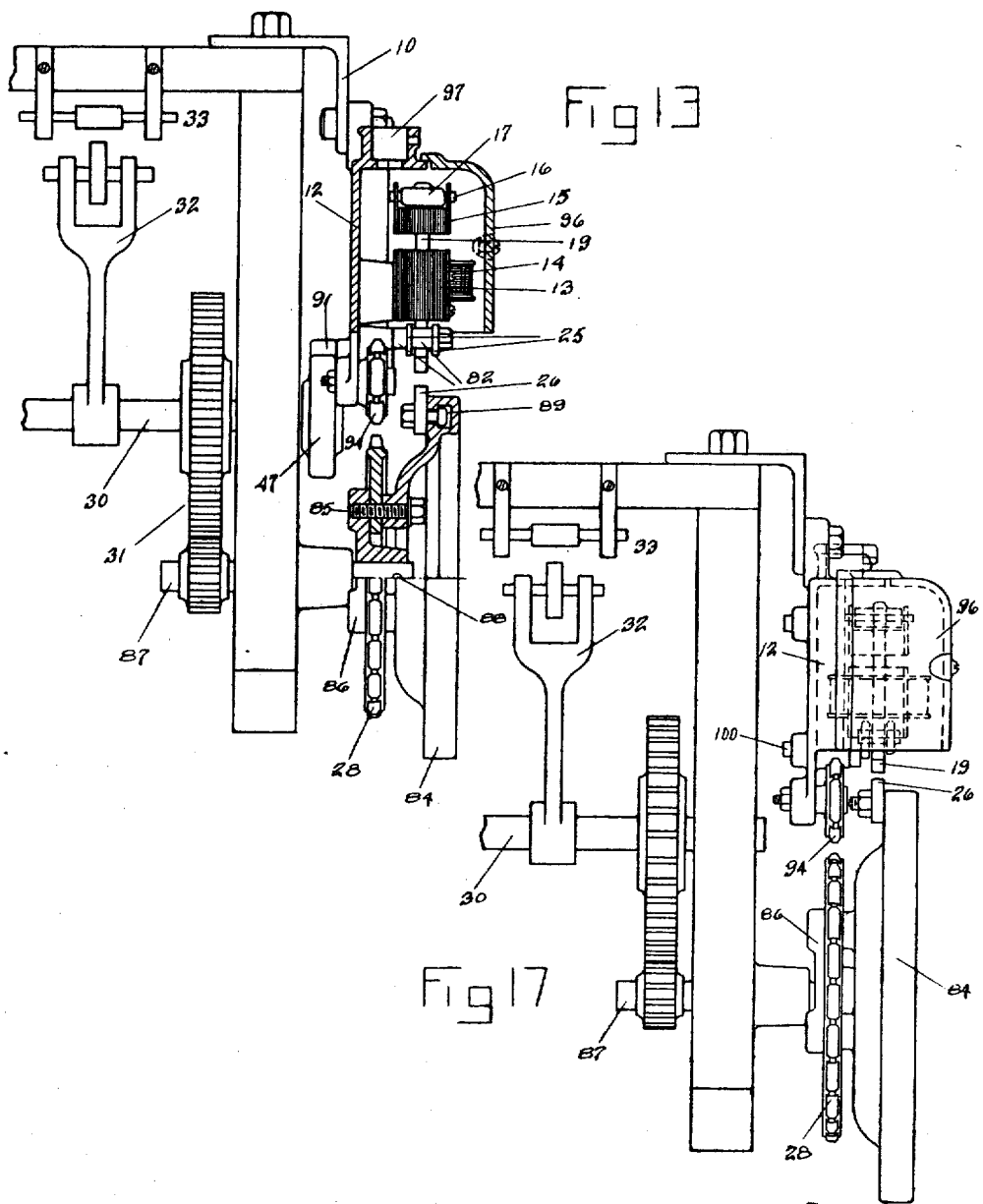

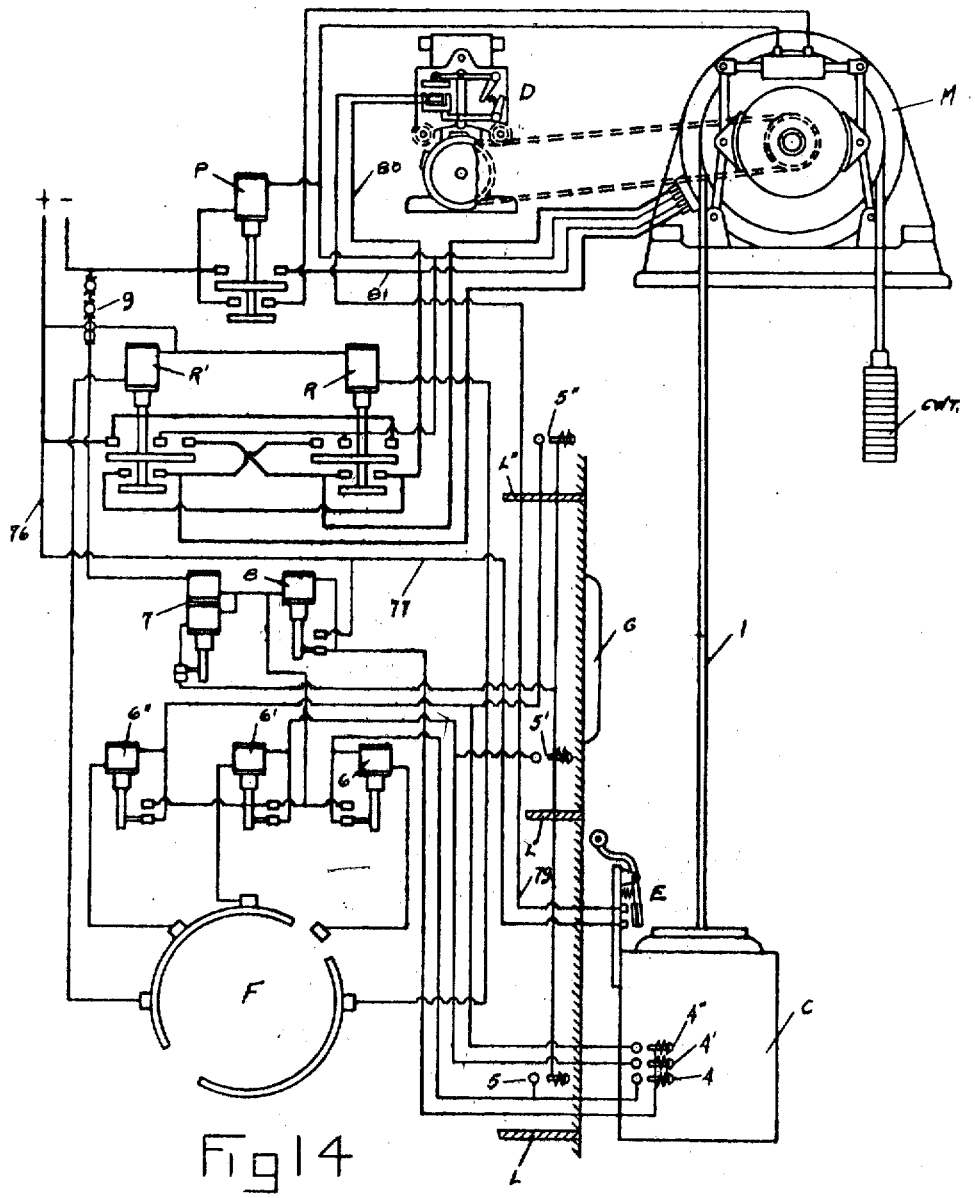

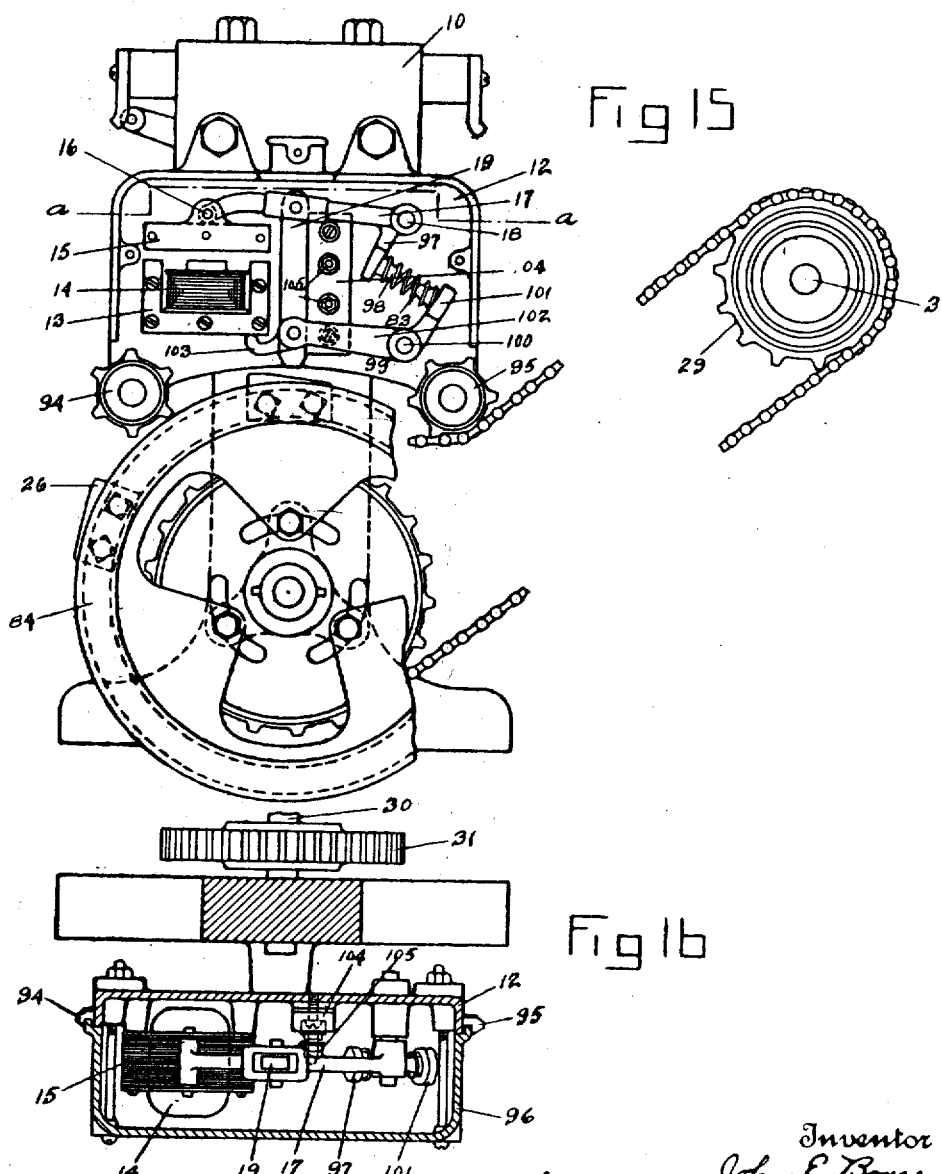

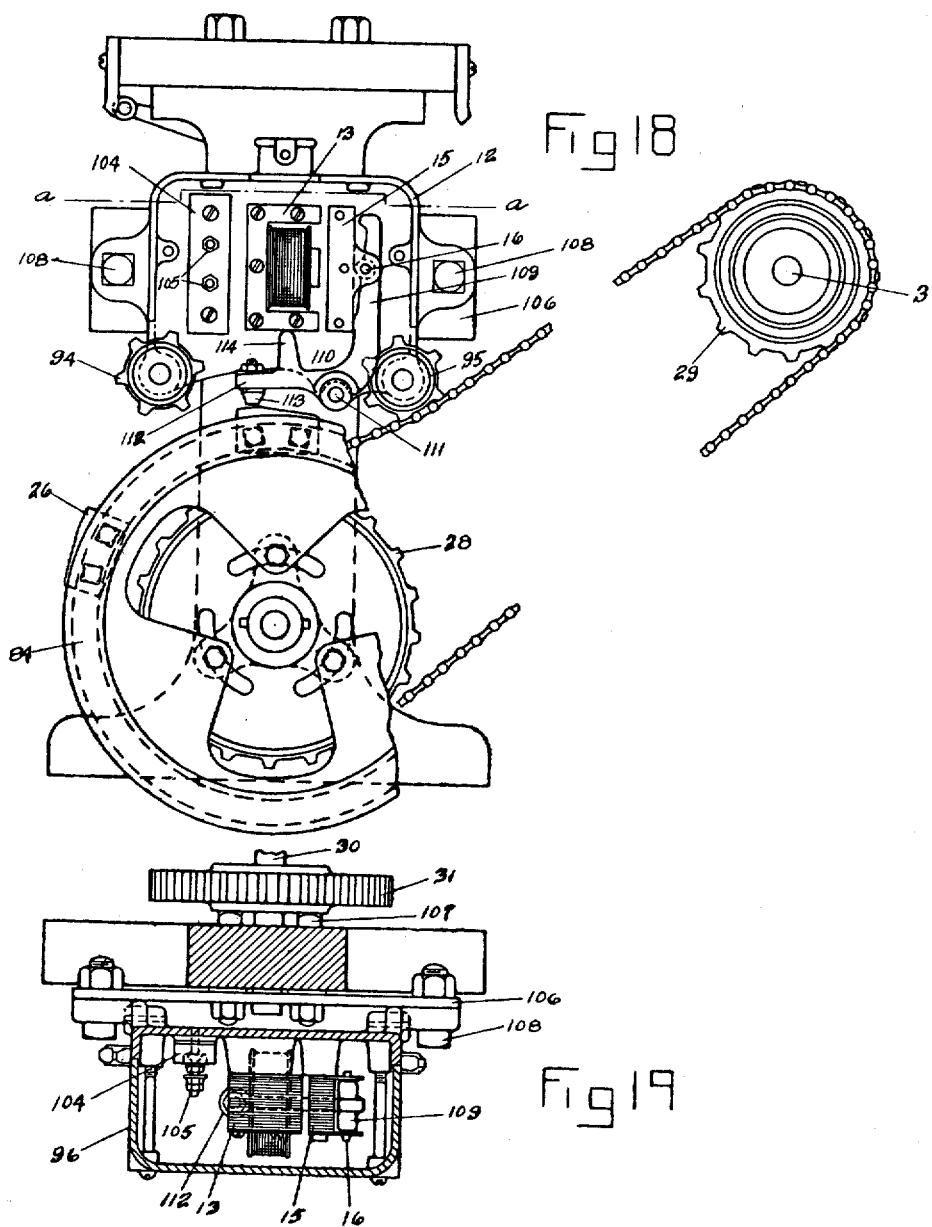

Patented Apr. 24, 1923.

1,452,490

UNITED STATES PATENT OFFICE.

JOHN E. BOYCE, OF YONKERS, NEW YORK, ASSIGNOR TO OTIS ELEVATOR COMPANY, OF JERSEY CITY, NEW JERSEY, A CORPORATION OF NEW JERSEY.

CORRECTING DEVICE FOR FLOOR CONTROLLERS.

Application filed April 14, 1921. Serial No. 461,382.

*To all whom it may concern:*

Be it known that I, JOHN E. BOYCE, a citizen of the United States, residing in Yonkers, in the county of Westchester and State of New York, have invented a new and useful Improvement in Correcting Devices for Floor Controllers, of which the following is a specification.

My invention relates to improvements in electric control systems for use with electric traction elevators having a floor controller. The improvement is not however entirely confined to this type of elevator, but may be used with any other type of hoisting apparatus for the purpose set forth hereinafter. The invention is shown herein applied to what is commonly known as an automatic push-button elevator system.

In an electric elevator system, commonly known as a traction elevator, where a friction or traction sheave on the hoisting motor shaft directly imparts motion to the elevator car and counterbalance, there is occasional slipping or creeping of the cables in relation to the hoisting or driving sheave. When the hoisting machine is provided with a floor controller which is customary when employing a push button system of circuits to operate the machine, any slipping or creeping of the cables obviously results in a change or displacement of the floor controller in the machine with the car position in the hatchway, with a result that the accuracy of bringing the car to a landing is impaired. An object of the present invention is to provide means whereby the floor controller or apparatus that controls the stopping of the car may possess the proper relation to the position of the car so that an exact landing may always be effected in the operation of the elevator.

The invention consists more essentially in the provision of means, automatically operable to control the elevator car in stopping at a landing to effect an exact or level stop therewith, as of first intention, as it may be called; the elements involved in accomplishing this result being operable independently of the car speed and load, and being in the form of apparatus auxiliary and ancillary to the elevator apparatus as generally known.

Other objects of the invention and the precise nature thereof will appear more fully hereinafter.

Referring to the accompanying drawings.

Figures 2, 3, 4, 5 and 6 illustrate somewhat in detail the floor controller mechanism, with the present invention adapted thereto.

Figure 7 illustrates a fragmentary view of one end of the shaft of the driving motor embodying somewhat in detail the friction sprocket that is used to run the floor controller.

Figures 8, 9, and 10 show fragmentary views of several details of the present invention.

Figure 1:
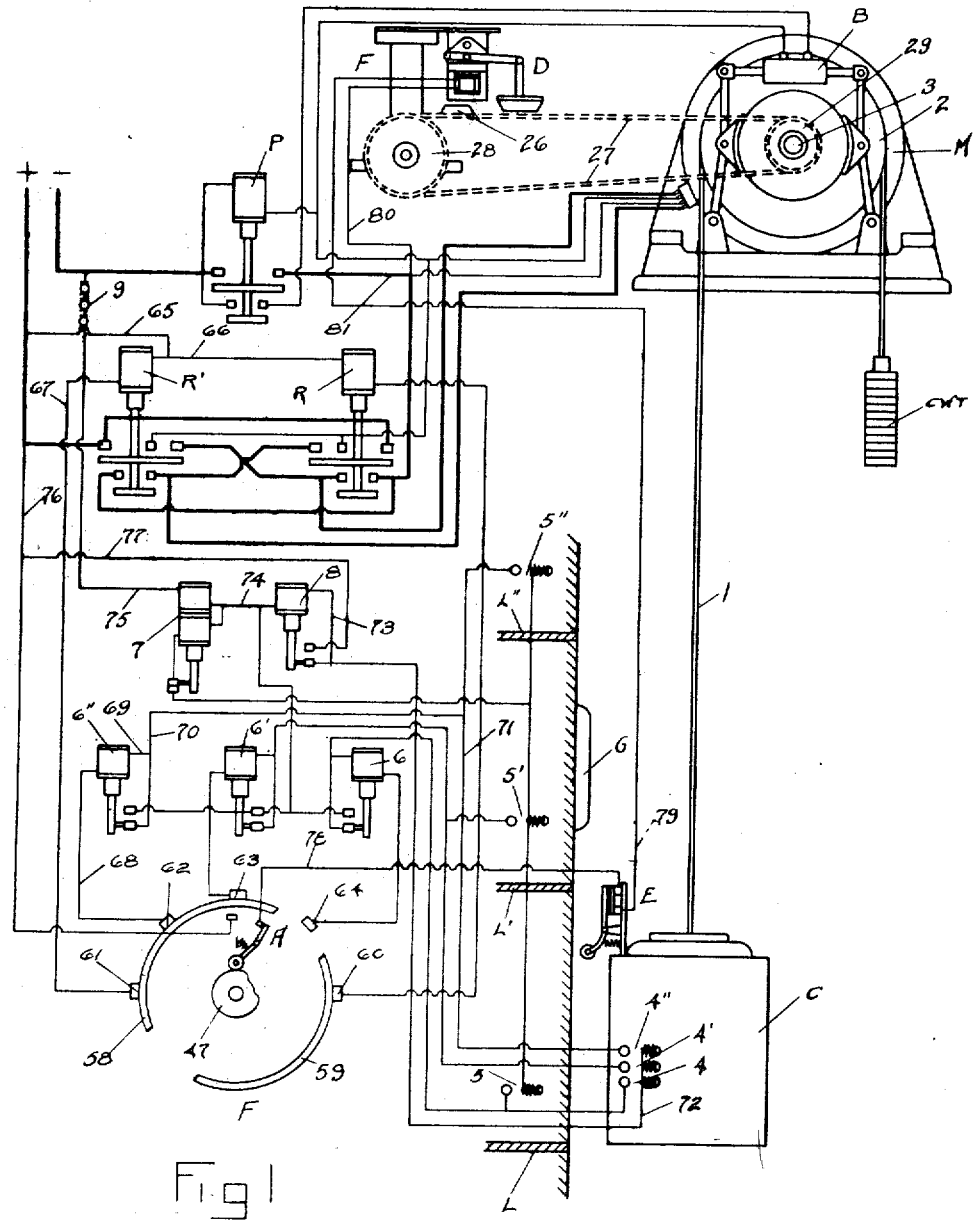
Figure 1 illustrates a traction elevator, arranged with a typical electric elevator system, including a floor controller, embodying an automatic push-button control, arranged in accordance with the present invention.

Figures 11, 12 and 13 illustrate a floor controller mechanism of a modified construction usable with the invention shown in the Fig. 1. Figure 12 and Figure 13 are sectional views of Fig. 11 taken on the line 12—12 and 13—13 respectively.

Figure 14 illustrates diagrammatically the invention in a modified form.

Figures 15, 16 and 17, illustrate another modification of a floor controller mechanism, usable with the invention illustrated in Fig. 14. Figure 16 is a sectional view of Fig. 15, taken on the line 16—16.

Figure 20:
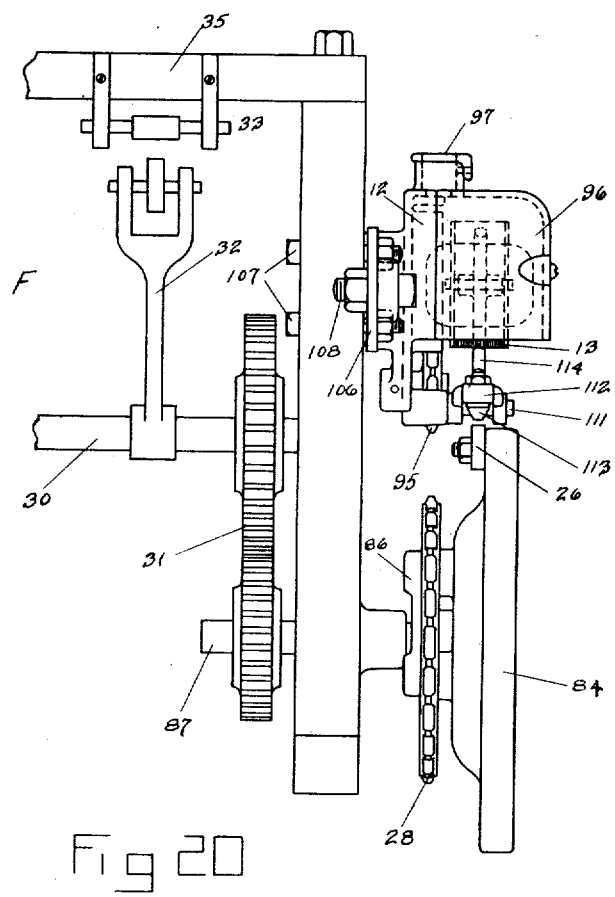

Figures 18, 19, and 20 illustrate a floor controller mechanism of a still further modified construction, usable with the invention shown in the Fig. 14. Fig. 19 is a sectional view of Figure 18 on the line 19—19.

Like reference characters denote similar parts in all of the figures.

Referring now to Fig. 1, an elevator car, C, is suspended by hoisting cables, 1, which run over a driving sheave, 2, secured to a shaft, 3, of a motor, M. The usual counterweight, cwt., is secured to the ends of the cables opposite to the car. An electro-mechanical brake of a well-known type is designated, letter B.

Electro-magnetic reversing switches to control the motor, M, are designated, R and R'; the switch, R, controls the motor for descending direction of car travel, and the switch, R', for ascending direction of travel. A potential switch is designated by letter, P.

The automatic push-button apparatus comprises car push-buttons, 4, 4', 4'', hall push-buttons, 5, 5', 5'', floor switches, 6, 6', 6'', a non-interference switch, 7, a car holding switch, 8, door contacts, 9, and a floor controller, F; the latter may be of the usual well-known construction, as illustrated in the Figures 5 and 6, and operated in the usual way to control the various circuits of the push-button system.

In my invention I employ what I may term a correcting device, D, and which will be better understood from the description by referring to Figures 2 and 3, which show its design, and also its position of mounting referable to the floor controller.

Referring to Figs. 2 and 3, they show the device fastened to an angle iron, 10, which is bolted to a plate, 11, the latter being fastened to the floor controller, F. The device comprises a base plate, 12, to which is fastened an electro-magnet, 13. There is a magnet winding, 14, of the magnet, and an armature, 15, pinned at 16 to a lever 17; the lever is also pinned at 18 to the base plate, 12, the lever being free to turn, and is held in place by a cotter-pin, (not shown). To the other end of the lever is pinned a rod, 19, held in place by cotter-pins (not shown). To the rod, 19, is fastened an adjusting block, 20, by screws, 21, the latter also serving to hold to the adjusting block, 20, a distance piece, 22, which will be referred to hereinafter. To the adjusting block, 20, are fastened pawls, 23. There are slotted holes in the adjusting block, see Figs. 8 and 9, through which the pawls are fastened by bolts, 24, see Figs. 2 and 3, to permit adjustment of the pawls. The rod, 19, is held in place and guided by a slot, formed by fastening a strip, 25, to the base plate, 12. A chain block stop, 26, is used in conjunction with the other parts of my device. It is fastened to the floor controller driving chain, 27, which runs over a sprocket, 28, on the floor controller, F, and another sprocket, 29, which is mounted on the shaft, 3, of the motor, M.

The floor controller illustrated in Figs. 4, 5, and 6, briefly stated, comprises a rock shaft, 30, operable in unison with the movement of the elevator car, C, through the intermediation of a gearing, 31, and other connections hereinafter described. There are rocker arms, 32, 32', 32'', 32''', carried by the shaft, 30, these arms being adapted to actuate switches, 33, 33', 33'', 33''', respectively. The switches 33, 33'', control the car in descending, being opened by their respective arms when rocked in a clockwise direction, which corresponds to the descending direction of car travel, and are closed by the movement of the said arms in an anti-clockwise direction. The switches, 32', 32''', control the car in ascending, being opened by their respective arms when the latter rock in an anti-clockwise direction, and closed by the rocking of the said arms in a clockwise direction. It will be mentioned that two of the switches are provided, one for the bottom and one for the top landing, L, L'', and two of the switches for the intermediate landing L'. Each switch, such as 33, for example, comprises a pair of separated depending contact strips, 34, 34', secured to, but insulated from, the controller framework 35. A conductor, 36, is adapted to bridge the strips, 34, 34', and thereby close the circuit of the said contacts at that point. The conductor, 36, is carried by, but insulated from, an arm, 37, adapted to rock on a fixed rod, 38. The arm is provided with a member, 39, through the intermediation of which the arm is rocked in reverse direction by engagement with a roller, 40, carried by the rocker arm, 32.

To one side of the floor controller, F, is fastened a switch, A, as shown in Fig. 6. Briefly stated, the switch consists of a movable member, 41, and a stationary member, 42. To the member, 41, is affixed an electrical contact, 43, suitably insulated from the arm, and to the contact is fastened an electrical conductor cable, 44, the other end of the cable being fastened to a terminal, 45, on the stationary member, 42, of the switch. To the lower end of the switch arm is affixed a roller, 46. Mechanical contact engagement of the roller, 46, with a cam, 47, affixed to the rocker shaft, 30, opens or closes the switch, as the case may be. The closing of the member, 41, makes contact engagement with an electrical contact, 48, affixed to the stationary member of the switch. This contact is also suitably insulated. A spring, 49, is also part of the switch which helps the member, 41, to close when the roller, 46, falls into a recess in the cam, 47, by virture of the turning of the cam on the rocker shaft, 30, thereby insuring a better electrical contact between the contacts of the switch.

Referring to Fig. 7, there is illustrated therein as a fragmentary view, one end of the shaft, 3, of the motor, M, shown partly in detail, and upon which is affixed a friction device which is used in conjunction with the invention and, briefly stated, consists of a stud, 50, rigidly screwed to the end of the shaft, 3. Mounted on the stud is the sprocket wheel, 29, washers 51 and 52, the latter being keyed to the stud, 50, by a key, 53. An expansion spring, 54, whose continual action on the washers causes the sprocket to turn in normal conditions, when the shaft, 3, rotates through the revolving of the motor, M, by virtue of the contact of the washers, 52, with the washers, 51, which latter have frictional contact with the sprocket wheel. The pressure of the spring upon the washers is governed by the turning of a lock nut, 55, against one of the surfaces of a washer, 56, which latter on its opposite side has contact with the spring. A pin, 57, is employed to prevent the turning of the stud, 50, should it become loose in the shaft, 3.

Referring to Figs. 8 and 9, they illustrate in different views one of the elements used in my invention in a fragmentary form. The element is not shown entirely assembled in these views, for the sake of clearness. In Fig. 8 is shown the adjusting block, 20, with its slotted holes, spoken of heretofore, to allow the adjusting of the pawls, 23. This adjusting and reason for the same will be explained later. The distance piece, 22, is fastened to the adjusting block, 20, by means of the screws, 21, which also serve to hold the rod, 19, to the adjusting block; as has heretofore been stated. The distance piece serves to prevent any turning of the pawls, and also completes the gap between them, making one surface, as shown in Fig. 9. This distance piece 22, may vary in size, as will be explained later.

Fig. 10 illustrates a part of the chain, 27, and the chain block stop, 26. This chain block stop may be made a part of the chain by substituting it for one of the blocks between any two links.

The diagrammatic illustration of the floor controller F in Fig. 1, consists of two segments, 58, and 59, adapted to make contact with stationary brushes, 60, 61, 62, 63 and 64, the brushes, 60 and 61, being connected to the windings of the reversing switches, R, R', respectively. The contact segments may be mounted upon a suitable insulating base as described in connection with Figs. 5 and 6, and rotated in unison with the hoisting motor of the elevator car through the driving chain connection between the floor controller sprocket and the motor, as described in connection with Figs. 2 and 3.

The operation of the elevator will now be described, and since the system of circuits is well known, it will be described only briefly.

In Fig. 1 the car is at rest at the basement landing, which I have designated by L, the operating circuit being broken at the brush, 64, of the floor controller, F. Let it be assumed that the car button 4" in the car C, is pressed, this serving to close a circuit for the winding of the reversing switch R' as follows: + main, wire 65, wire 66, through the winding of the reversing switch R', wire 67, brush 61, segment 58, brush 62, wire 68, through the winding of the floor switch 6''', wire 69, wire 70, wire 71, button 4", wire 72, wire 73, through the winding of the car holding switch, 8, wire 74, through the uppermost winding of the non-interference switch 7, wire 75, door contacts 9, to the — main. The reversing switch R' will now close, and effect the release of the brake B and the operation of the motor M, to operate the car in an ascending direction. Operation of the car in an ascending direction effects rotation of the sprocket, 28, of the floor controller, as in Fig. 5, in a clockwise direction, the segments 58 and 59 which co-relate to the rocker shaft, 30, in Figs. 5 and 6, being rotated in a reverse direction or anti-clockwise, through the gearing 31. Thus when the car approaches within a predetermined distance of the top landing, which is designated by L", the operating circuit is opened by the segment 58, disengaging the brush 62. In this manner the circuit to the reversing switch winding R' is opened and the reversing switch will open and disconnect the motor from its source of power supply and effect application of the brake to retard and stop the car. When the above circuit was made, by closing the contacts of the above mentioned switches, another circuit was also made from the + main wire 76, wire 77, through the contacts of the car holding magnet, (as we said they are closed), wire 73, through the windings of the car holding and non-interference switches to the — main as stated above. This last mentioned circuit completes what is known as the car holding circuit, well-known to those versed in the elevator art, its completion preventing anybody else from operating the car from either the car or hall until the operation that is already taking place is completed by the arrival of the car at its predetermined landing and the opening of the door contacts by the opening of the door.

From the above description, it will be seen that the floor controller functions to control the car in its movement after a car button is pressed automatically to stop the car at the desired landing. The floor controller also functions to control the car in stopping at a desired floor landing in a similar manner by pressing a hall button.

For a descending direction of car travel, the contact segments 58 and 59 and rocker shaft 30 will rotate in a clockwise direction.

It may be observed at this point that in the operation of the elevator, creeping and slipping of the cables may occur, and therefore, the action of the correcting device will now be described. It will be understood that in order for the correcting device to restore the floor controller to its correct position relative to the car, it is necessary that the relative position of the floor controller shall be ahead of the car at the moment the correcting device begins to perform its correcting operation; therefore, should the floor controller happen to be behind the car, the correcting device will not begin to perform its operation of correcting the position of the floor controller until after the direction of travel of the car has been reversed. In the following description of operation of the correcting device, it will be assumed that the floor controller has gotten ahead of the car as the result of the slipping or creeping of the cables, and that the car is at the bottom landing, as indicated in Fig. 1, and will be started therefrom in an ascending direction.

As has been stated, there is a connection between the motor and the floor controller, F. In the ascending movement of the car, a switch E on the car comes in contact with a cam G in the hatchway, opening the contacts of the switch, but before this has occurred, the roller of the switch A, mounted on the floor controller has fallen into the recess of the cam, 47, by virtue of the cam turning with the shaft, 30, due to the floor controller being driven by the motor. The dropping of the roller into the recess allows the contacts 43 and 48 of the switch A to complete a circuit from the +main, wire 76, through the contacts of switch A, they being closed at this time, wire 78, through the contacts of switch E, wire 79, through the winding 14, of the electro-magnet, 13, of the correcting device, D, wire 80, wire 81, through the contacts of the switch P, they also being closed at this time, to the — main. The magnet 13 will now pull down its armature, 15, which in turn acts to pull down the rod, 19, with its pawls, 23. Should the stop block, 26, on the driving chain, 27, come in contact with the pawls, 23, the latter will stop the movement of the block, and the chain will cease to move; the pull of the magnet upon its armature and in turn upon the rod and its pawls, is of greater strength than the frictional engagement between the sprocket, 29, on the shaft, 3, and the washers, 51, and conseqeuntly the pawls stop the movement of the block and the chain. The chain will now remain stationary, until the switch E has been opened by the contact of its roller with the cam G, thereby opening the circuit, deenergizing the winding, 14, and, therefore, removing the downward pull of the armature on the rod, 19, and allowing the stop block to proceed under the pawls, 23, and therefore the chain likewise to resume its movement. Of course, the stop block has to lift up the pawls before it can proceed underneath them, as has been stated, but the effort to lift them is not great enough to impede the progress of the block carried on the chain, which goes to show that when the magnet of the device is energized, its downward pull on the rod and the pawls is greater than the frictional engagement between the sprocket, 29, and the washers, 51 and 52, and when the magnet is deenergized, the frictional engagement between the sprocket, 29, and its washers is greater than the effort required of the block to lift the rod and its pawls, thereby allowing the chain to travel in accordance with the speed of the motor. This defined explanation illustrates the working of my invention of a correcting device, when the floor controller is out of step with the moving car. When there is no slipping or creeping of the cables, the floor controller is in step with the car, the stop block on the chain passes underneath the pawls during the period that the switch on the car is held open by its contact by the cam in the hatchway. Should the car be out of step with the floor controller, the chain will be stopped by the block, as first above explained. The cam, 47, on the floor controller, which operates the switch A, is designed to close the said switch when the car is on either side of the cam G in the hatchway. In other words, the interval of time between the closing of the switch A on the floor controller and the opening of the switch E on the car is the measure of distance either side of the cam G from that point in the hatchway that the car is at the time of the closing of the switch A. This distance is arbitrary and it is in this zone, as we may call it, that the correcting device will function, as if the floor controller be out of step at this time the progress of the stop block, 26, will be checked when it reaches the pawls, 23, and is stopped by them, as has already been stated; the closing of the said switches A and E, establishing the circuit to the magnet winding, 14, of the magnet of the correcting device, D, as has already been explained. The cam, 47, also serves to act in still another capacity, where the chain 27 makes more than one complete revolution. In the latter case, the cam 47 will hold the switch A open during the time that the stop block on the chain is passing underneath the pawls, 23. The cam 47 is of such a size and design as to take care of both of the features just explained.

It will be desirous to adapt the length of the cam G to different car speeds. If this is done, the distance apart the pawls 23 from each other on the correcting device, D, will also have to be changed, so that the time given for the stop block 26, upon the chain 27, to pass underneath them will be of a value relative to the time required for the car to pass the cam G in the hatchway. It is for this reason that the adjusting block, 20, of the correcting device, D, is provided with slotted holes, as heretofore mentioned, to allow adjustment of the pawls, and likewise the distance piece, 22, between them will also have to be adjusted to suit.

The correcting device functions in a similar manner in the downward motion of the car. The invention is not limited to function with only one cam in the hatchway; but there may be any other number of cams according to the run or travel of the car.

In many installations, one cam may be found to be sufficient; generally speaking, in all probability there will be no occasion to use more than two cams, G; one at the top and one at the bottom of the hatchway. In the case of more than the one cam G, that I have shown, changes in the present device would have to be made to suit the additional hatchway cams, of course; for instance, an additional cam 47 on the floor controller and switch A would have to be provided. I have shown only one hatchway cam G, controller cam 47, and switch A, for the sake of simplicity, placing the hatchway cam near the first floor to get as many corrections and resettings of the floor controller as possible in the operation of the car, as the car invariably returns to the first floor after each trip. It will be observed that in Fig. 1 the stop block 26 is shown at the left hand of the pawl 23, and in Fig. 2, to the right hand, looking at those figures; it is of no matter, however, which side of the pawl the figures happen to show the block.

In the Figures 11, 12 and 13 are shown in different views a modification of the present invention as already stated herein. By observing these views it will be seen that some parts of the embodiment of the invention are in a form even more compact than the embodiment previously described.

As in the previous case, we have the device mounted upon the floor controller F, by means of the angle iron, 10, to which is fastened the base plate, 12, of the correcting device. Briefly, there is the electro-magnet, 13, with its coil, 14, the former being fastened to the base plate. The armature, 15, is the same as before but at this time is fastened to one end of the lever, 17, the other end of the lever swings on the fixed pivot, 18, which is part of the base plate, 12, and is held in place by a cotter pin (not shown). At the center or thereabouts, of the lever, 17, is pinned the rod, 19, which is held in place by cotter pins (not shown). This rod as heretofore is guided in its movement by the slot formed by fastening the strips, 25, to the base plate. To obtain the said slot I use several bushings, 82, the slot being formed by the strips, 25, bridging these bushings.

There is this difference that the rod, 19, is equipped with a spring, 83, which acts against the downward pull of the electromagnet, 13, on its armature, 15, so that when the coil, 14, is deenergized the spring acts to lift the armature up from the magnet, also lifting the rod, 19, up, and from the path of the stop blocks, 26, which in the present modification are affixed to the inner side of a wheel, 84, as illustrated in Fig. 13, and whose three connecting points, 85, are fastened to the same centers as are those of the sprocket wheel, 28, and to the same sprocket hub, 86, the latter being mounted upon a shaft, 87, and held in place by a pin, 88. Going back to the wheel, 84, it is provided with a slotted hole, 89, through its entire circumference and by means of which adjustment of the stop blocks, 26, is obtained.

It may be well to state at this time that the rod, 19, is not equipped with pawls as in the design first above described; the rod, 19, itself being designed to engage the stop blocks, 26, alone, contact of the rod, 19, with the stop blocks, stops the rotation of the wheel, 84, and also the sprocket wheel, 28, they being connected together as already stated; this discontinuance of the moving of the said wheels in turn causes the sprocket chain, 27, to cease its travel, the sprocket wheel, 29, on the motor shaft, 3, functioning as has already been stated herein.

Together with this modification of the correcting device there is used the switch, A, shown in Fig. 6, the two switches differing in construction only, that is, the latter switch functions the same as the switch, A, in the Fig. 1, being operated by the cam, 47, in its rotating on the shaft, 30, as described before. A fibre block, 90, affixed to the base plate, 12, upon which is mounted the electrical contacts, 48, may be understood to represent the stationary member of the switch, which was designated by 42, in the first design of the invention, the movable member being designated by 41, as before.

It will be observed that the member, 41, in this modification is made up of two arms, pivoted on a common center, a lower arm, 91, being in back of the base plate, 12, as shown in Fig. 12, and that the lower end of the said arm is somewhat ball shaped, see Fig. 11, to allow the end of the arm to fall into the recess, of the cam, 47, as before. The spring, 49, is provided to help this action and to insure a positive electrical contact between the contact, 43, on an upper arm, 92, of the member, 41, and the contacts, 48, of the stationary member, 42; one end of the spring being butted against a boss, 93, formed on the base plate, 12.

An added feature to the present modification of the correcting device is the addition of two sprocket wheels, 94, and 95, not embodied in the first design, and which are fastened to the base plate at its lower end as illustrated. Their object is to direct the chain, 27, to the sprocket wheel, 28, should occasion require it. I have employed the sprocket wheel, 95, as an illustration. Should the lead into the sprocket wheel, 28, be the opposite to that shown the wheel, 94, would be used.

Added to the Figs. 12 and 13, are shown a section of a cover, 96, its object being to encompass the correcting device, and is fastened to the base plate, 12, as shown in the figures.

In order to avoid complexity in the several views I have not shown the leads from the coil, 14, but by referring to Figure 1, it can be readily seen where the leads are to be connected, they lead out of the correcting device through the hole, 97, in its top.

Figure 14, illustrates diagrammatically, the embodiment of a further modification of the invention, its construction being more particularly shown in the Figs. 15, 16 and 17. The operation of the several switches which control the motor, M, is obtained in the same manner as related in the description of Figure 1.

In this modification, the switch, A, as used in the preceding designs, is dispensed with, which will be seen upon referring to Fig. 15.

It will be noticed that in this case the switch, E, on the car is normally open switch and is not closed until it engages with the cam, G, in the hatchway, through the movement of the car obtained by the operation described with reference to Fig. 1. Engagement of the switch, E, on the car with the cam G, in the hatchway, closes the switch, thereby completing a circuit from the plus main, wire, 76, wire, 77, through the contacts of the switch, E, they being closed at this time, wire 79, through the coil 14 of the correcting device, wire 80, wire 81, through the contacts of the switch, P, they being closed at this time, the same as described in reference to Fig. 1, and thence to the minus main.

The circuit just described causes the coil, 14, of the electro-magnet, 13, to pull down on its armature, 15, and in turn pull down the rod, 19, into the path of the stop blocks, 26, the latter being affixed to the wheel, 84, as stated in the last foregoing modification.

From the aforesaid description of the correcting device it will be seen that the device functions during the time that the car C. is passing the cam G, in the hatchway, and should the floor controller be in errant to the position of the car at this time, the floor controller will be corrected to its just position with the car. By virtue of the rod, 19, of the correcting device being pulled down into the path of the two stop blocks, 26, on the wheel, 84, contact of one of the stop blocks with the rod, 19, is had; which one of them being determined by the particular direction of rotation of the floor controller. The contact stops the movement of the floor controller, the wheel, 84, the sprocket wheel, 28, and chain, 27, and they remain in this stopped position until the switch E on the car has been disengaged from the cam G in the hatchway; this disengagement, of course, opens the circuit to the coil, 14, of the electro-magnet, 13, of the correcting device, relieving the downward pull of the armature, 15, and in turn the downward pull on the rod, 19, allowing it to be free to be pulled up and out of the path of the stop block by the action of a spring which will be mentioned hereinafter. From the aforegoing, it will be seen that the floor controller is now in step with the car. Should there be no inaccuracy on the part of floor-controller, F, with respect to the position of the car in the hatchway, at the time when the switch on the car is closed by its engagement with the cam in the hatchway, through the movement of the car, the rod, 19, of the correcting device will have been pulled down into the path of the stop block, by virtue of the operation previously described, but between the stop blocks on the wheel, 84, one of the stop blocks just clearing the rod, 19, because the floor controller and the car are in step, and when the switch, E, on the car is disengaged from the cam G the rod, 19, will be pulled up and away, the rod, 19, just clearing the other stop block. The effective length of the cam in the hatchway and the distance between the stop blocks of the correcting device are equal, not in linear units, but in the matter of time as to their operation, to cooperate with each other.

It may be remarked that there is no correcting zone, so to speak, on either side of the cam, G, in the hatchway, as is the case in the operation of the correcting device in the design first described, which was necessary in the employment of the switch, A, on the floor controller. The switch on the car engaging the cam in the hatchway opened the circuit to the coil of the electro-magnet of the correcting device in the former case, the correcting of the floor controller in respect to the position of the car in the hatchway having taken place before the switch on the car engaged the cam in the hatchway, as has already been stated. But in the present modification of the invention, engagement of the switch on the car with the cam in the hatchway closes the said switch, completing the circuit to the coil, 14, of the electro-magnet, 13, of the correcting device, D, the correcting of the floor controller with respect to the position of the car in the hatchway taking place at that time.

As the construction of the embodiment of the modification of the invention shown in Figures 15, 16 and 17 differs very little from the modification shown in Figures 11, 12 and 13, only those points that differ will now be mentioned.

As before, the armature, 15, of the electro-magnet, 13, is pinned at 16, to an end of the lever, 17, the other end of the lever being pinned at 18, and swings. At this point, the lever, 17, carries an arm, 97, equipped at its end with a boss, 98, to permit the spring, 83, to be placed over it. At the lower end of the rod, 19, is pinned a bell-crank lever, 99, and which swings on a fixed pivot, 100. To an arm, 101, of the bell-crank lever there is another boss to permit the end of the spring, 83, opposite to the end placed on the boss, 98, of the arm, 97, of the lever 17, to be placed over it. To an arm, 102, of the bell-crank lever, 99, is affixed a finger 103. This finger comes in contact with the electro-magnet, 13, when its coil, 14, is deenergized, as pictured in the Figure 15. The lifting up of the rod and out of the path of the stop blocks, 26, on the wheel, 84, is caused by the spring, 83, acting between the arm, 97, of the lever, 17, and the arm, 101, of the bell-crank lever, 99. This action also causes the armature, 15, of the electro-magnet to be raised, as will be seen by the means of connection. It is during this action that the finger, 103, of the arm, 102, of the bell-crank lever, 99, is brought up against the electro-magnet and impedes any further progress that the spring, 83, might have upon the arm, 97, of the lever and the arm, 101, of the bell-crank lever. The distance that the rod, 19, is raised is sufficient for it to clear the stop blocks, 26, on the wheel, 84.

Fastened to the base plate, 12, is a fibre block, 104, used as a terminal board for the leads of the coil, 14, they being fastened to terminals, 105, and from the terminals other leads are brought out from the correcting device as stated of the preceding modification. The other parts of the present modification are the same as in the first mentioned modification.

In Figures 18, 19 and 20 is illustrated in different views a still further modification, this being a modification of the design illustrated in the Figures 15, 16 and 17 and in all probability the preferred type to be used in its particular service of keeping the floor controller or a like apparatus in step with the moving car. This design is likewise mounted on the floor controller, F, as before, but by means of a plate, 106, fastened to it by bolts, 107. To the plate, 106, is fastened the base plate, 12, of the correcting device by means of bolts, 108.

The electro-magnet, 13, and its coil, 14, are the same as before described, but are fastened to the base plate, 12, in a vertical position as shown in the Figure 18. The armature, 15, is pinned at 16, to an arm, 109, of a bell-crank lever, 110. The lever is pinned at 111, to the base plate, 12, and free to turn. To an arm, 112, of the bell-crank lever, 110, is fastened a stop, 113, which engages the stop blocks, 26, on the wheel, 83, when cause for the same occurs. A boss, 114, forms part of the last named arm, 112, of the bell-crank lever, and is adapted to come in contact with the electro-magnet, 13, when the occasion occurs, similarly as described of the finger, 103, Figure 15.

The bell-crank lever, 110, is designed and the weight of each arm, 109 and 112, is of such a value that when the coil, 14, is deenergized the arm, 109, will pull the armature, 15, away from the magnet causing the lower arm, 112, to be swung in an upward direction clearing the stop, 113, from the path of the stop blocks, 26, on the wheel, 84, and at the same time the distance between the electro-magnet, 13, and its armature, 15, is not too great but that the pull of the electro-magnet upon its armature by the coil, 14, when energized can draw it to it.

This last modification is to be used with the system of circuits illustrated in Fig. 14, and as they have already been described, it is not necessary to describe them again. The other parts of this modification are the same as in the first and second modifications, of the invention.

Having thus described my invention, and without limiting myself to the precise details of construction and arrangement of parts, what I claim as new and desire to secure by Letters Patent of the United States is:

1. In an elevator having a floor controller, a device to correct the relative position of the car and floor controller with each other, where they have been displaced as the result of slippage or creeping of the car hoisting cable, the device comprising means whereby the motion of the floor controller is arrested until the correct relative position of the car and controller is restored.

2. In an elevator having a floor controller, a device to correct the relative position of the car and floor controller with each other where they have been displaced as the result of slippage or creeping of the hoisting cable, the device comprising means adapted to be actuated by the movement of the car to arrest the motion of the floor controller until the correct position is restored.

3. In an elevator having a floor controller, comprising power transmission means to operate it, a device adapted to correct the relative position of the car and floor controller in case there is slippage or creeping of the hoisting cable, the device comprising means adapted to be projected into engagement with the floor controller to arrest its motion until the correct relation between it and the car is restored.

4. In an elevator having a floor controller, and yielding means to drive the same, a device to correct the relative displacement between the car and controller caused by slippage or creeping of the hoisting cable, the said device comprising means to arrest the motion of the said driving means, until the correct relation between the car and controller is restored.

5. In an elevator having a floor controller, and means adapted to operate it, an electro-responsive apparatus adapted to be operated to correct the relative displacement between the car and controller caused by the slippage or creeping of the hoisting cable, comprising an electro-magnet and a circuit thereto, and its armature, the latter adapted, when actuated by the magnet, to arrest the movement of the said driving means of the floor controller, until the correct relation between the car and controller has been restored.

6. In an elevator having a floor controller, and means adapted to drive it, an electro-responsive apparatus, adapted to be operated to correct displacement between the car and controller caused by slippage or creeping of the hoisting cable, comprising an electro-magnet, a circuit thereto, an armature, the latter involving a stop mechanism, adapted to be actuated by the movement of the elevator apparatus and armature to stop the said driving means until the correct relative positions of the car and controller have been restored as the result of the operation of the electro-responsive apparatus.

7. In an elevator having a floor controller, and driving means for the same, an electro-responsive apparatus, adapted to be operated to cause the displacement between the car and controller by slippage or creeping of the hoisting cable to be corrected, comprising an electro-magnet and its armature, the latter, when actuated by the magnet, adapted to stop the said driving means, until the said displacement has been corrected, and a circuit to the said magnet, and a switch adapted to close the circuit by the movement of the elevator apparatus, whereby the magnet may be energized.

8. In an elevator having a floor controller, and a driving means for the same, comprising a rotatable wheel, stop blocks thereon, and an electro-responsive device, including a stopping mechanism, the responsive device adapted to be energized by the movement of the elevator apparatus to effect an engagement between the said stopping mechanism and blocks to arrest the rotation of the said wheel, and means to energize the said responsive device.

9. In an elevator, having a floor controller, and driving means for the same, comprising a wheel, adjustable angularly about its axis, and a stop block thereon, adjustable circumferentially of the wheel, and a stopping mechanism, the latter and the blocks adapted to engage with each other, and arrest the rotation of the said wheel.

10. In an elevator having a floor controller, and means to drive the same, comprising a sprocket wheel, a member fast thereto, and adapted to be angularly adjusted with respect thereto, the said member being slotted, and a stop block, adjustable in the slot, circumferentially of the sprocket wheel; and a stopping member adapted to engage the stop block and hold the sprocket wheel against rotation.

11. In an elevator having a floor controller, and means to operate it, an electro-magnetically operable device, adapted to engage the means which operate the floor controller, to stop its operation, a circuit to the magnet, including a normally open switch, adapted to be closed by the movement of the elevator apparatus, and thereby cause the magnet to be energized.

12. In an elevator, having a floor controller, and means to operate it, an electro-magnetically operable device, adapted to engage the means which operate the floor controller to stop its operation, in case the car and controller are out of step with each other, a circuit to the magnet, and a switch and a cam, adapted to engage each other by the movement of the elevator apparatus, and open or close the said circuit.

13. In an elevator having a floor controller, and means to operate it, an electro-magnetically operable stopping apparatus, comprising a circuit to the magnet and a switch in the circuit, a catch, and a series of movable stop blocks, spaced apart from each other, the switch being adapted to be operated by the movement of the elevator apparatus, and cause the magnet to be energized and move the catch into the path of movement of the stop blocks, and engage one of the blocks, and stop the motion of the floor controller, when the latter and the car are out of step with each other, by reason of the slippage or creeping of the hoisting cable.

14. In an elevator, having a rotatable floor controller, and moving means to operate it, an electro-magnetically operable stopping apparatus, comprising a circuit to the magnet, a switch in the circuit, a catch, a series of stop blocks, spaced apart from each other, a cam in the hatchway, adapted to close the switch by the movement of the car, and energize the magnet to cause the catch to engage one of the stop blocks, in case the car and controller are out of step with each other, by reason of the slippage or creeping of the hoisting cable, but between the stop blocks if the car and controller are in step with each other, the effective length of the cam and the space between the stop blocks being equal in the matter of time of functioning cooperatively with relation to each other.

15. In an elevator, having a floor controller, a device to stop the controller when the car and controller are out of step with each other because of slippage or creeping of the hoisting cable, and means whereby, when the car and controller are in step with each other, the stopping device is held out of cooperative stopping relation with the controller.

16. In combination with an elevator car, having a floor controller, a lock for the controller, means operated by the movement of the elevator apparatus for operating the lock.

17. In combination with an elevator car, having a floor controller, a stopping device for the controller, comprising electro-magnetic means, and means affixed to the hatchway for operating the lock when the car and controller are out of step with each other caused by the slippage or creeping of the hoisting cable.

18. In an elevator with a floor controller and power transmission means to drive it, a stopping apparatus for the floor controller, comprising electro-magnetic means, and means operated by the movement of the elevator apparatus to apply the stopping apparatus, when the car and controller are out of step with each other, and means whereby, when the car and controller are in step with each other the stopping device will be held in effect out of operative position to stop the controller.

19. In an elevator, having a rotatable floor controller, means between the elevator and the floor controller adapted to rotate the controller, and an electromagnetically operable means adapted to engage said floor controller operating means, and thereby temporarily arrest the movement of the controller in case the car and controller are out of step with each other by reason of slipping or creeping of the elevator cable, whereby the proper relative adjustment betewen the car and said controller is restored.

In testimony whereof, I have signed my name to this specification.

JOHN E. BOYCE.